United States Patent
Riekers et al.

[15] 3,657,561
[45] Apr. 18, 1972

[54] PASSIVE FREQUENCY DETECTION CHANNEL FOR A DATA RETRIEVAL SYSTEM

[72] Inventors: Henry G. Riekers, Glen Burnie; Bradley P. Closs, Severna Park, both of Md.

[73] Assignee: Westinghouse Electric Corporation, Pittsburgh, Pa.

[22] Filed: May 21, 1970

[21] Appl. No.: 39,278

[52] U.S. Cl. ................................. 307/233, 324/77 E, 333/6, 333/72, 343/8
[51] Int. Cl. ........................................................ H03h 7/02
[58] Field of Search ............... 307/233; 324/77 E; 333/6, 72; 343/8

[56] References Cited

UNITED STATES PATENTS 3,461,407  8/1969  Ruggles et al. .................... 333/72 X
3,593,165  7/1971  Grubbs ............................. 324/77 E X Primary Examiner—T. H. Tubbesing
Attorney—F. H. Henson, E. P. Klipfel and J. L. Wiegreffe

[57] ABSTRACT

A passive frequency detection channel utilizing shared crystal resonators respectively coupled to opposite ends of a center tapped secondary transformer winding. The crystal resonators are coupled to a passive current summing network and envelope detector and post detection integrator by means of a shared resistor isolation network. Current summing is provided by the resistor isolation network while the envelope detector is comprised of one of a pair of Schottky barrier diodes commonly referred to as hot carrier diodes coupled between the isolation network and a post detection integrator comprising a parallel R-C circuit. Additionally the R-C circuit in combination with both diodes provides a low AC impedance to ground for the crystal resonators and isolation network which is essential for proper operation of the apparatus.

12 Claims, 4 Drawing Figures

PATENTED APR 18 1972 3,657,561

PASSIVE FREQUENCY DETECTION CHANNEL FOR A DATA RETRIEVAL SYSTEM

CROSS REFERENCE TO RELATED APPLICATION

The present application is related to U.S. Pat. application, Ser. No. 765,059 entitled "Frequency Detection Channel For a Signal Data Retrieval System," filed on Oct. 4, 1968 in the names of Norman A. Ruggles and Irving I. Kaplan, now U.S. Pat. No. 3,585,532. Said co-pending application, moreover, is assigned to the assignee of the present invention.

BACKGROUND OF THE INVENTION

1. Field of the Invention

This invention is directed to a frequency detection channel providing predetection filtering with coherent integration, envelope detection and post detection integration for retrieving information signal data dispersed in a wide spectrum of signal frequencies including noise frequencies and other frequencies of random phase and amplitude. Such apparatus is utilized, for example, as a spectrum analyzer in a pulsed doppler radar system. Moreover, a plurality of frequency detection channels are generally a part of a contiguous filter bank wherein each filter in the bank has an identical bandpass with a center frequency separation of adjacent filters being a constant frequency increment.

2. Description of the Prior Art

It is well known in such systems referred to above that the process of detecting signals in random noise is materially enhanced by reducing the bandwidth through which the received target signal plus noise passes before a detection decision is made. It has been found that a doppler frequency shift of a radar echo signal is measurable to a satisfactory degree of resolution by utilizing a large number of contiguous channels of selected bandwidth which collectively cover the band of frequencies having information bearing significance. In effect, the continuum of frequencies is quantized such that the bandwidth of one of the frequency channels becomes one quantum. The center frequency of the entire channel filter bank then establishes the center of the doppler shifted frequency signal power spectrum. This frequency channeling coincides with the bandwidth reduction made necessary or desirable by the requirements of signal detection.

Accordingly, the present state of the art doppler radar apparatus employs a receiver which includes a multichannel frequency detection system in which the doppler frequency resolution is carried out by bank of contiguous frequency filters. To examine the output of the filter bank, frequency detection channel means are included which perform the functions of predetection integration, demodulation of the envelope, post detection integration and storage. The output is then fed to data processing means which makes use of the detection decisions which are generally binary in nature and arranges the received information in accordance with a predetermined logic into sets describing a particular target. The signal data information in the power spectrum output of the individual channels may, moreover, be handled by conventional digital data handling equipment of conventional design.

Apparatus of the type described, for example, is disclosed in U.S. Pat. No. 3,181,149 granted to Norman L. Weinberg and Ralph J. Metz as well as U.S. Pat. No. 3,345,572 granted to Irving I. Kaplan and Joseph G. Fay. It is to be noted that for n detection channels, prior art apparatus such as disclosed in U.S. Pat. No. 3,345,572 requires the use of 2n crystal resonators, 2n resistors, 2n coupling elements, and n square loop storage integrator cores.

In the above noted co-pending related application, however, n frequency detection channels utilizing the concepts of the multi-function capabilities of a square loop core integrator as well as the principles of shared resonator bandpass filter design are incorporated to reduce the number of components required so that for n frequency detection channels, n + 1 resonators, n + 1 resistors and n square loop storage integrator cores are utilized. Each of the bandpass filters is comprised of a crystal resonator coupled to one input winding of a shared square loop core with an adjacent channel crystal resonator being coupled to the other input winding in an opposite polarity sense from the former to provide a shared resonator filter. That is, each resonator is shared magnetomotively in adjacent channels. The envelope detection and post detection integration is performed by a respective square loop storage integrator core. While this invention operates in the manner intended, certain inherent disadvantages exist. First of all, a square loop storage integrator core has relatively poor dynamic range, i.e. at a given signal level an increase in the signal will not cause a proportional increase in the output. Secondly, it is very non-linear over relatively large temperature range. Additionally, cross talk between adjacent channels due to common windings presents a problem.

SUMMARY OF THE INVENTION

The present invention is directed to a frequency detection channel wherein the heretofore required square loop core integrator is eliminated while retaining the concept of shared crystal resonators. A frequency detection channel of the subject invention comprises, inter alia, a transformer coupled to a source of input signals and providing 0° and 180° outputs from the secondary winding thereof. A first and a second crystal resonator, each having a selectively different resonant frequency are respectively coupled to the 0° and 180° outputs. A resistive isolation and summing network couples the first and second crystal resonator together at a circuit junction providing the sum of two currents derived from the two resonators which are 180° out of phase. The circuit junction comprises a summing point which is terminated by means of a low AC impedance comprising a parallel R-C circuit combination and a first and second Schottky barrier diode commonly referred to as a hot carrier diode to a point of reference potential or ground such that passive current summing, envelope detection and post detection integration is provided. The first diode is connected in series between the summing point and one side of the R-C combination. The second diode is connected in an opposite polarity relationship relative to the first diode from the summing point to the opposite side of the R-C combination. Hot carrier diodes are preferred because of their relatively fast operating speed and low turn-on or threshold characteristic, i.e. 200 millivolts as compared to approximately 600 millivolts for other types of conventional diodes. Use of this type of diode provides the necessary low AC impedance to the point of reference potential for the crystal resonators as well as providing a significant improvement in small signal detection capability. Additionally, the linearity of the circuit is improved and the range over which the diode network will not be reversed biased by the R-C integrator network is increased.

DESCRIPTION OF THE PREFERRED EMBODIMENT

Figure 1:
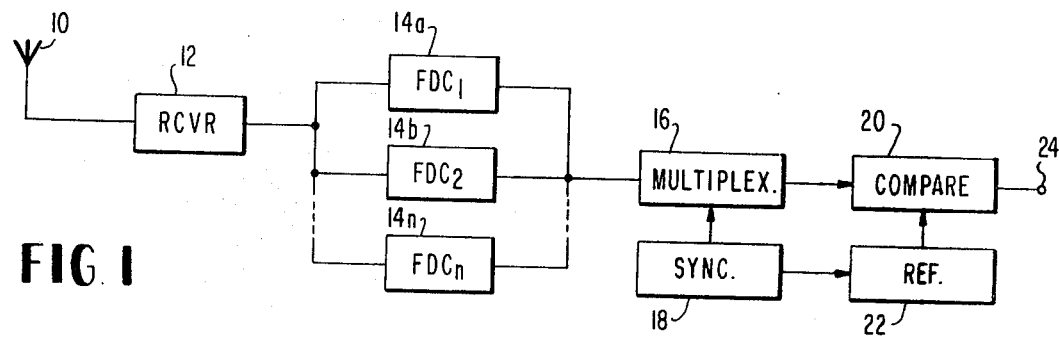
FIG. 1 is a schematic block diagram of a plurality of contiguous frequency detection channels comprising the subject invention utilized as individual filters of a contiguous filter bank for apparatus such as a pulsed doppler radar system.

Referring now to the drawings wherein like numerals refer to like parts, FIG. 1 discloses the environment for the present invention wherein it is desirable to retrieve one or more information signals dispersed in a wide spectrum of signal frequencies. Such a system may be, for example, a pulsed doppler radar system wherein a receiving antenna 10 is coupled to a range gated receiver 12 which is responsive to radar returned echo signals. The IF output of the receiver 12 is coupled to a plurality of contiguous frequency detection channels 14a, 14b, ... 14n, each of which quantizes discrete portions of the doppler echo spectrum. Each frequency detection channel has an identical pass band but a constant increment of frequency separation between the center frequencies of adjacent channels. The respective output of each of the frequency detection channels 14a ... 14n is coupled into a multiplexer circuit 16 which is adapted to provide a time sharing capability of all the outputs of the frequency detection channels such that when it is driven by a synchronizer 18, each channel output is adapted to be compared with a reference target in a comparative circuit 20 receiving inputs from the multiplexer 16 and a reference target source 22, also controller in timed relationship with the multiplexer 16 by means of the synchronizer 18. The output of the comparator appearing at terminal 24 is coupled to data processing means, not shown, for selectively operating on the signal in a predetermined manner.

Figure 2:
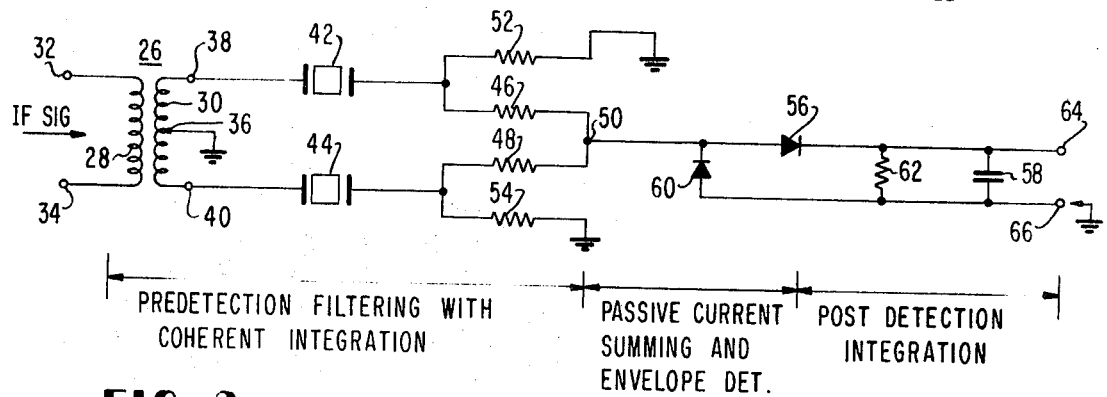
FIG. 2 is an electrical schematic diagram of the preferred embodiment of the subject invention illustrating one frequency detection channel.
Figure 3:
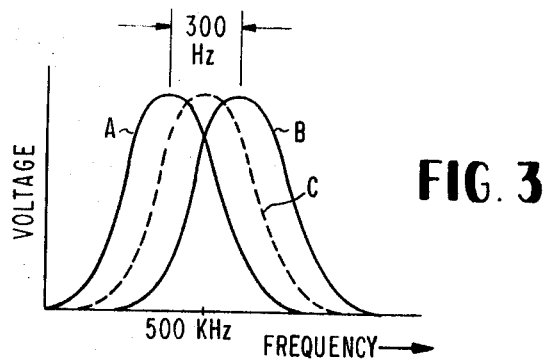
FIG. 3 is an illustrative diagram of the operating characteristic of a pair of crystal resonators utilized in the embodiment shown in FIG. 2.

Referring now to FIG. 2, there is disclosed an electrical schematic diagram of the preferred embodiment of one frequency detection channel which may be, for example, one of the frequency detection channels 14a ... 14n shown in FIG. 1. The frequency detection channel comprises, inter alia, an input transformer 26 having a primary winding 28 and a center tapped secondary winding 30. A pair of input terminals 32 and 34 connected to the ends of the primary winding 28 are adapted to be coupled, for example to the IF output of the receiver 12 shown in FIG. 1. The center tap 36 of the secondary winding 30 is returned to a point of reference potential illustrated as ground. The end terminals 38 and 40 provide transformer output signals which are 180° out of phase with respect to one another. Accordingly, terminal 38 may be defined as the output terminal of the transformer 26 which is in phase (0°) with the input signal applied across the input terminals 32 and 34 while terminal 40 may be defined as the terminal which is 180° out of phase with the input. A first and a second crystal resonator 42 and 44, each having similar resonance characteristics but having respective center frequencies separated by a predetermined increment as shown by curves A and B of FIG. 3, are respectively connected to terminals 38 and 40. Two resistors 46 and 48, respectively isolate the crystal resonators 42 and 44 from each other while at the same time connecting them to a circuit junction or summing point 50. Since the signals applied to the resonators 42 and 44 are 180° out of phase with respect to one another, a composite filter characteristic such as shown by curve C of FIG. 3 results which is sensed as a summation of two currents appearing at the summing point 50 when the summing point 50 is connected through a low AC impedance to ground. Resistors 52 and 54 are utilized to symetrically balance the output of the shared crystal resonators. The crystal resonator and resistor network combination thus described provides a predetection filtering function with coherent integration. In order for proper operation, however, the crystal resonators 42 and 44 must be terminated in a low AC impedance to ground so that the current appearing at the summing point 50 is determined only by the crystals and the sharing resistors 46 and 48. This extremely low AC impedance is provided in the subject invention by a first diode 56 and capacitor 58 for the positive half cycle of the AC signal appearing at the summing point 50 while a second diode 60 coupled to the opposite side of capacitor 58 provides the low impedance for the negative half cycle. A capacitor 62 is connected in parallel with the resistor 58 and the diode 56 in combination with the capacitor 58 forms the function of an envelope detector of the AC signal appearing at the summing point 50. The resistor 62, however, in combination with the capacitor 58 performs the function of post detection integration. The output of the frequency detection channel appears across terminals 64 and 66 with terminal 66 being adapted to be connected to ground.

Typically, the frequency detection channel such as shown in FIG. 2 would be comprised of two crystal resonators which would have a frequency separation of, for example, 300 HZ and with the lowest center frequency of the composite filter characteristic curve C being in the range of 500 HKHz. This is illustrated moreover in FIG. 3. By staggering a plurality of crystal resonators having ascending or descending resonant frequencies separated by substantially equal increments, a comb filter can be implemented.

Additionally, the diodes 56 and 60 are preferably Schottky barrier diodes commonly referred to as hot carrier diodes because the forward turn-on voltage or threshold characteristic is considerably lower than conventional diodes, being in the order of 200 millivolts as compared to approximately 600 millivolts for conventional diodes. Use of this type of diode provides the low AC impedance necessary as will as significant improvement in small signal detection capability. Hot carrier diodes also improve the linearity of the circuit and increase the range over which the diode network will not be reverse biased by the R-C integrator network.

Figure 4:
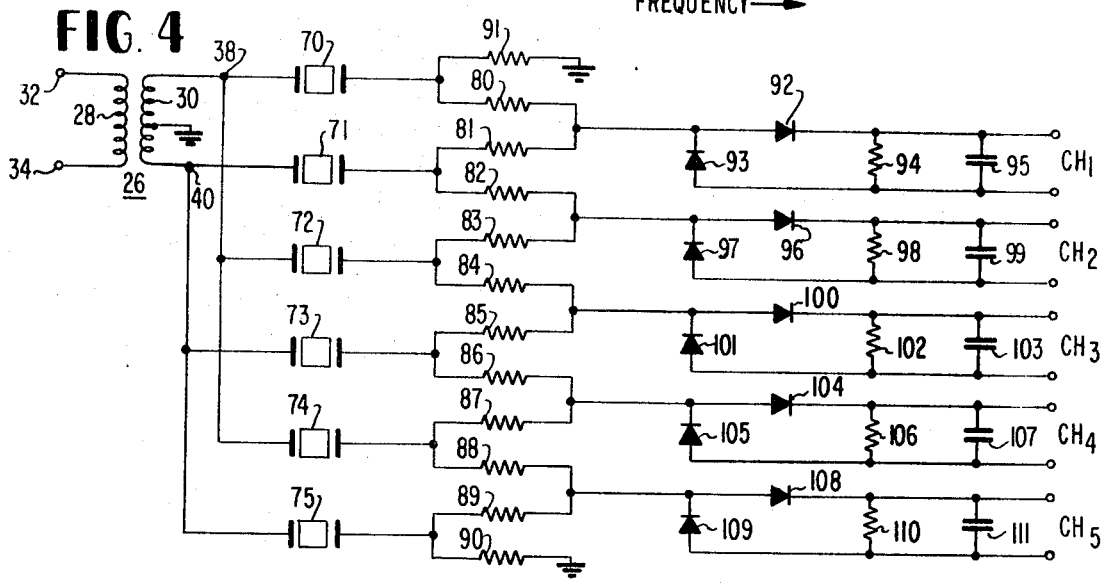
FIG. 4 is an electrical schematical diagram of a plurality of contiguous frequency detection channels wherein each channel includes the preferred embodiment of the subject invention.

The embodiment of the subject invention shown in FIG. 2 lends itself particularly to a comb filter configuration as shown in FIG. 4, which provides a plurality of frequency incremented output channels $CH_1$, $CH_2$, $CH_3$, etc. The comb filter however requires only one input transformer 26. Every other crystal resonator is commonly connected to the same side of the center tapped secondary winding 30. For example, the even numbered crystal resonators 70, 72, 74, etc. are connected to secondary winding terminal 38 while the odd numbered resonators 71, 73, 75, etc. are commonly connected to secondary winding terminal 40. The first channel $CH_1$ includes sharing resistors 80 and 81, while the second or adjacent channel $CH_2$ comprised of crystal resonators 71 and 72 include resistors 82 and 83. The fifth channel $CH_5$, for example, is comprised of crystal resonators 74 and 75 and include the resistors 88 and 89. Resistors 91 and 90, respectively, terminate the first crystal 70 and the last crystal 75, respectively, to ground and provide a current balancing loop for the resistors 80 ... 89. Each channel also includes its respective hot carrier diode and parallel R-C combination. For example, the first channel $CH_1$ includes hot carrier diodes 92 and 93 and resistor 94 and capacitor 95 while the second channel $CH_2$ is comprised of hot carrier diodes 96 and 97, resistor 98 and capacitor 99. The intermediate channels $CH_3$ and $CH_4$ include corresponding diodes 100, 101 and 104 and 105 while the last channel $CH_5$ includes diodes 108 and 109.

All of the frequency detection channels $CH_1$ ... $CH_5$ share crystal resonators with its immediately adjacent channel. For example, the first and second channel $CH_1$ and $CH_2$ share crystal resonator 71 while the second and third channels $CH_2$ and $CH_3$ share crystal resonator 72. It can be seen from the embodiment shown in FIG. 4 that for n frequency detection channels, 1 transformer, $n + 1$ resonators, $n + 2$ resistors, $2n$ hot carrier diodes and n parallel R-C circuits are required.

Since no square loop magnetic core is required in the present invention, the dynamic range is greatly enhanced being limited only by the turn-on voltage of the diodes on the low side and the crystal resonators on the high side. Another advantage is that the hot carrier diodes do not have to be interrogated as do the magnetic cores, thus eliminating the circuitry necessary to perform this function. Also, the construction of the diode detector is much simpler than when a core is utilized. Furthermore the use of a single transformer with diode detection provides a compact filter with none of the problems associated with either active devices or magnetic cores such as cross talk between individual filters. Finally, since the filter can be fabricated in a small space, it lends itself readily to a monolithic construction. Having thus described what is at present considered to be the preferred embodiment,

We claim as our invention:

1. A frequency detection channel circuit adapted to be coupled to a source of electrical signal frequencies and being responsive to a selected frequency band thereof, comprising, in combination:

input means coupled to said source of signal frequencies and providing a first and a second output signal substantially 180° out of phase with respect to each other;

first frequency selective means including a pair of signal terminals and having a first predetermined frequency characteristic, coupled by means of one signal terminal to said input means and being responsive to said first output signal;

second frequency selective means including a pair of signal terminals and having a second predetermined frequency characteristic similar to said first frequency characteristic but separated therefrom by a predetermined frequency separation coupled by means of one signal terminal to said input means and being responsive to said second output signal;

first and second resistor means respectively coupling the other signal terminal of first and said second frequency selective means to a common circuit junction;

first and second diode means, each having a pair of electrodes, and having mutually opposite electrodes thereof connected to said common circuit junction;

a parallel resistance-capacitance combination comprising third resistor means and first capacitor means having one mutually common end coupled to the other electrode of said first diode means and the other mutually common end coupled to the other electrode of said second diode means; and output means coupled to said parallel resistance-capacitance combination, whereby said first diode means and said first capacitance means provides a first low AC impedance path for signals appearing at said common junction, said second diode means and said first capacitance means providing a second low AC impedance path for signals appearing at said common junction, said first diode means and said first capacitor means additionally providing envelope detection of said signals appearing at said common circuit junction, and said first diode means and said parallel resistance-capacitance combination providing post detection integration of said signals appearing at said common circuit junction.

2. The invention as claimed by claim 1 and additionally including fourth resistor means terminating said other signal terminal of said first frequency selective means to a point of reference potential and fifth resistor means terminating said other signal terminal of said second frequency selective means to said point of reference potential thereby balancing the output of said first and second frequency selective means.

3. The invention as defined by claim 2 wherein said first and second diode means comprises semiconductive diodes.

4. The invention as defined by claim 3 wherein said semiconductive diodes are comprised of Schottky barrier diodes.

5. The invention as defined by claim 4 wherein said first and second frequency selective means each comprises a resonator element.

6. The invention as defined by claim 5 wherein each said resonator element comprises a crystal filter resonator.

7. The invention as defined by claim 6 wherein said input means comprises a transformer having a primary winding and a secondary winding including a center tap connected to said point of reference potential and additionally including circuit means coupling one end of said secondary winding to said first crystal filter resonator and the other end of said secondary winding to said second crystal filter resonator.

8. The invention as defined by claim 1 and additionally including at least a third frequency selective means including a pair of signal terminals and having a third predetermined frequency characteristic similar to said first predetermined frequency characteristic but separated in frequency from said first and second frequency selective means by predetermined increments, coupled by means of one signal terminal to said input means and being responsive to one output signal thereof;

fourth and fifth resistor means respectively coupling the other signal terminal of said second and third frequency selective means at a second common circuit junction;

third and fourth diode means each having a pair of electrodes and having mutually opposite electrodes connected to said second common circuit junction;

a second parallel resistance-capacitance combination comprising sixth resistor means and second capacitor means having mutually common ends respectively coupled to the other electrode of said first and second diode means;

and second output means coupled to said second parallel resistance-capacitance combination whereby said second frequency selective means and said third frequency selective means provide a second frequency detection channel and whereby said second frequency selective means comprises a shared resonator element between said first and said second frequency detection channels.

9. The invention as defined by claim 8 and additionally including seventh resistor means coupled to and terminating the other signal terminal of said first frequency selective means to a point of reference potential, and eighth resistor means coupled to and terminating the other signal terminal of said third frequency selective means to said point of reference potential, thereby balancing the outputs of said first, second, and third frequency selective means.

10. The invention as defined by claim 9 wherein said input means comprises a transformer having a primary winding coupled to said source of signal frequencies and a secondary winding having a center tap connected to said point of reference potential and one end thereof provides said first output signal and the other end provides said second output signal.

11. The invention as defined by claim 10 wherein said first, second, third and fourth diode means comprises hot carrier diodes.

12. The invention as defined by claim 11 wherein said first, second, third frequency selective means comprises crystal resonators.

* * * * *